United States Patent
Yun

[11] Patent Number: 6,009,164
[45] Date of Patent: Dec. 28, 1999

[54] TELEPHONE WITH A DETACHABLE KEY PAD AND METHOD FOR OPERATING IT

[75] Inventor: Sung-Hum Yun, Gumi, Rep. of Korea

[73] Assignee: SamSung Electronics Co., Ltd., Suwon, Rep. of Korea

[21] Appl. No.: 08/882,598

[22] Filed: Jun. 25, 1997

[30] Foreign Application Priority Data

Jun. 25, 1996 [KR] Rep. of Korea ............. 96-23617

[51] Int. Cl.⁶ ........................................ H04M 1/00
[52] U.S. Cl. ............. 379/368; 379/93.27; 379/110.01; 379/433; 345/169
[58] Field of Search ................ 379/368, 361, 379/362, 354, 355, 357, 93.27, 93.18, 433, 110.01; 341/22, 23; 345/169

[56] References Cited

U.S. PATENT DOCUMENTS

| | | | |
|---|---|---|---|
| 4,555,600 | 11/1985 | Morse | 200/5 A |
| 4,845,748 | 7/1989 | Bohannon | 379/368 |
| 4,870,531 | 9/1989 | Danek | 361/93 |
| 5,241,583 | 8/1993 | Martensson | 455/565 |
| 5,486,725 | 1/1996 | Keizer et al. | 307/116 |
| 5,528,235 | 6/1996 | Lin et al. | 379/368 |
| 5,544,959 | 8/1996 | Collin et al. | 335/202 |
| 5,563,936 | 10/1996 | Washington | 379/200 |
| 5,583,919 | 12/1996 | Talvard et al. | 379/88.03 |
| 5,793,865 | 8/1998 | Leifer | 379/430 |
| 5,901,223 | 5/1999 | Wicks et al. | 379/433 |

*Primary Examiner*—Forester W. Isen
*Assistant Examiner*—Jacques M. Saint-Surin
*Attorney, Agent, or Firm*—Robert E. Bushnell, Esq.

[57] ABSTRACT

A telephone is made up of a detachable key pad having a female connector, and a key pad receiving space formed to fit the key pad in the casing of the telephone with a male connector, wherein the female connector is connected with the male connector when the detachable key pad is inserted into the key pad receiving space.

11 Claims, 3 Drawing Sheets

TELEPHONE WITH A DETACHABLE KEY PAD AND METHOD FOR OPERATING IT

CLAIM OF PRIORITY

This application makes reference to, incorporates the same herein, and claims all benefits accruing under 35 U.S.C. §119 from an application for TELEPHONE WITH A DETACHABLE KEY PAD AND METHOD FOR OPERATING IT earlier filed in the Korean Industrial Property Office on the 25th day of June 1996 and there duly assigned Ser. No. 23617/1996, a copy of which application is annexed hereto.

1. Field of the Invention

The present invention concerns a telephone, and more particularly a key pad of a telephone.

2. Description of the Related Art

Nowadays, as the communication technology is developed, communication instruments are required to have various additional functions. For example, a telephone generally used in a home or an office has been developed to have various additional functions to provide conveniences to the user. Furthermore, when the telephone is exposed in public, it becomes required to properly restrict the use of the telephone.

U.S. Pat. No. 5,563,936 for a Lockout Telephone to Washington discloses a telephone with a keyswitch capable of making the keypad fully operational or inoperative, depending on the setting of the keyswitch. The keypad is not removable from the telephone and cannot be used as a calculator when the telephone is inoperative. U.S. Pat. No. 4,870,531 discloses a Circuit Breaker With Removable Display and Keypad to Danek discloses an electronic circuit interrupter digital display and keypad device where the display and the keypad are removable. Once again, the display and keypad are not from a telephone and do not seem to serve any other purpose once removed.

What is needed is a telephone housing that has a removable keypad and display. When removed, the keypad and display can function as a calculator in addition to preventing the unauthorized use of the telephone.

SUMMARY OF THE INVENTION

It is an object to provide a telephone with a detachable key pad to prevent the telephone from being appropriated and method for operating it.

It is another object to provide a means for utilizing the detachable key pad as a calculator when detached from the telephone set.

According to the present invention, a telephone is made up of a detachable key pad having a female connector, and a key pad receiving space formed to fit the key pad in the casing of the telephone with a male connector, wherein the female connector is connected with the male connector when the detachable key pad is inserted into the key pad receiving space.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
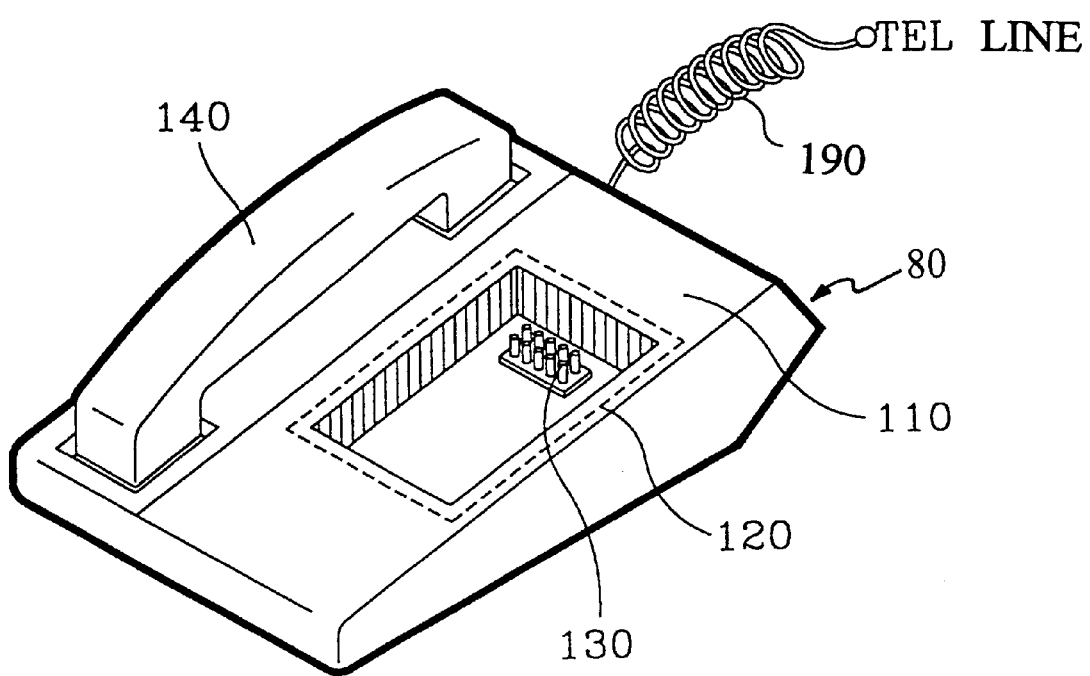
FIG. 1 is a view of the telephone housing with the telephone keypad removed therefrom.
Figure 2:
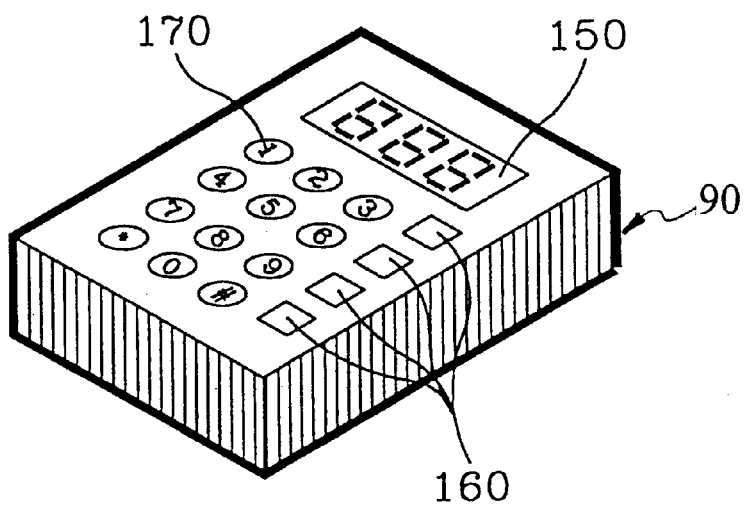
FIG. 2 is a view of the top side of the telephone keypad.
Figure 3:
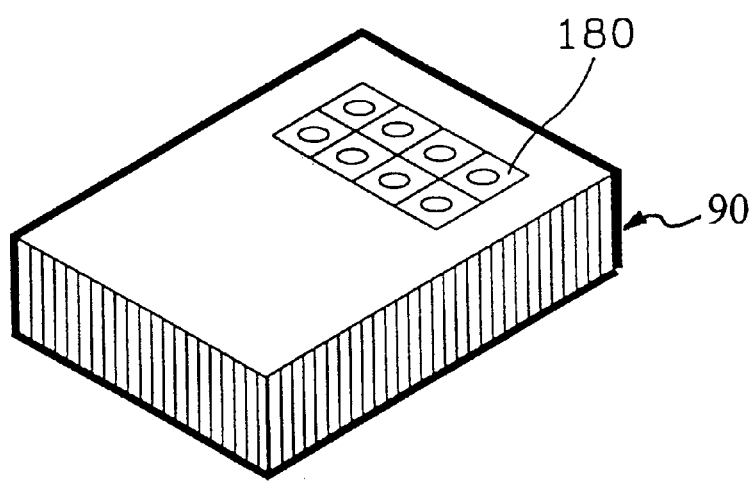
FIG. 3 is a view of the bottom side of the telephone keypad when removed from the telephone housing.

Referring to FIG. 1A, the casing 110 of a telephone 80 is provided with a key pad receiving space 120 having a male connector 130. The casing (or housing) also contains a handset 140 and a telephone line cord 190. Turning to FIG. 2, the key pad 90 includes an LCD display 150, a plurality of numeric keys 170 and a plurality of function keys 160. Mounted on the bottom of the key pad 90 is a female connector 180 as shown in FIG. 3.

Figure 4:
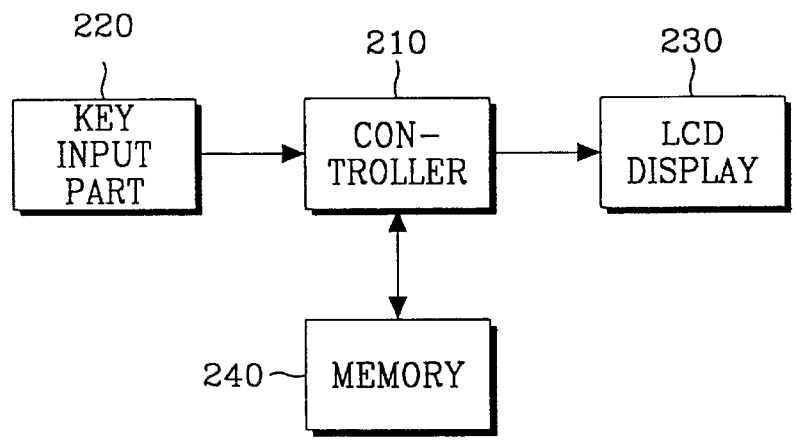
FIG. 4 is a block diagram for illustrating the functional circuit of a detachable key pad according to the present invention.

Describing the operational circuit of the inventive detachable key pad 90 with reference to FIG. 4, a key input part 220 includes the numeric keys and function keys to generate a key signal. A controller 210 detects, through the female connector 180, whether the key pad is detached from or attached to the casing, and generates a control signal in response to a key signal from the key input part 220. The LCD display 230 displays the operational state of the key pad in response to the control signal from the controller 210. A memory 240 is also provided to store private data such as telephone numbers.

Figure 5:
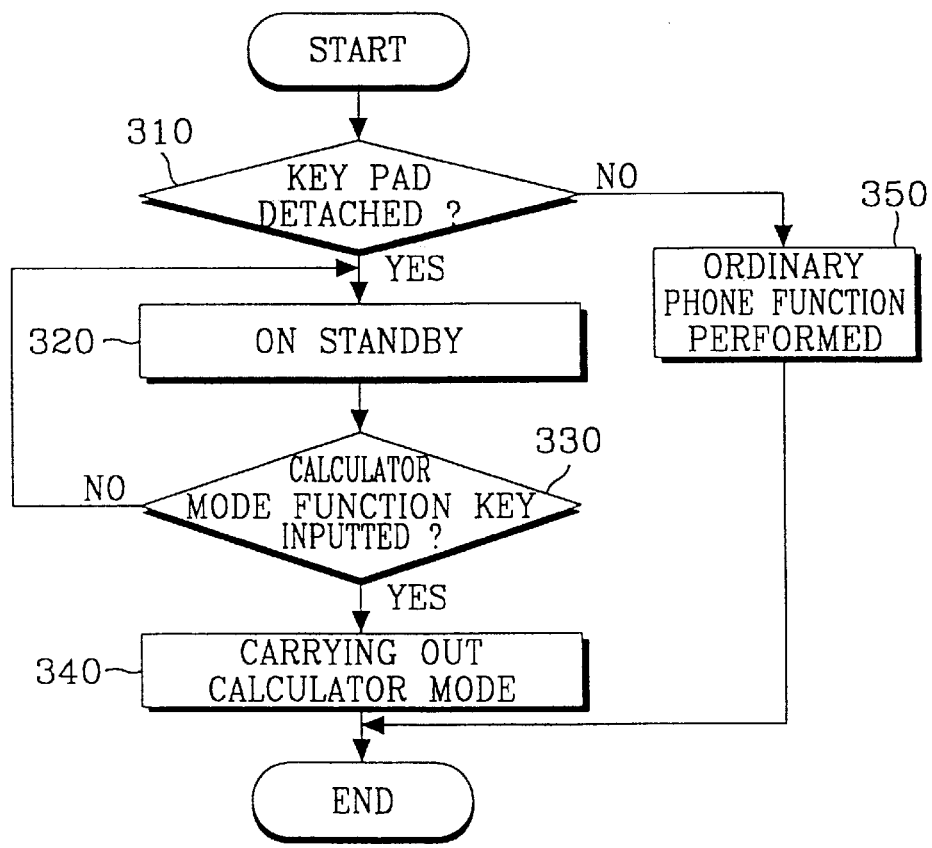
FIG. 5 is a flow chart for controlling the operation of a detachable key pad according to the present invention.

The detachable key pad is controlled as shown in the flow chart of FIG. 5. When the key pad is detached from the casing, it starts to serve as a calculator by inputting the function key commanding the calculator mode. In the first step 310, the controller 210 detects through the female connector 180 mounted as shown in FIG. 3 whether the key pad is detached from the casing. When the key pad is not detached from the casing, the operation is bypassed to step 350 to perform the ordinary phone function. However, the key pad being detached from the casing, the controller is on standby in step 320 until the function key is inputted from the key input part 220 to command the calculator mode. When detecting the inputting of the function key in step 330, the controller 210 carries out the calculator mode. Thus, there is provided a telephone which has a detachable key pad to prevent the telephone from being used and may serve for various functions such as calculator.

What is claimed is:

1. A telephone, comprising:

a housing including a handset and a line cord, said housing having a recess formed in the outer surface;

a first electrical connector wired to the circuitry inside the housing and mounted on the outer surface of the housing in said recess with the connecting end of the electrical connector directed away from the outer surface;

a keypad having keys on its upper surface, said keypad formed to fit into the recess and having a second electrical connector, complementary to said first electrical connector, mounted on a surface of the keypad not containing the keys;

said first and second electrical connectors being operationally connected when the keypad is placed in the recess.

2. The telephone of claim 1, further comprising:

a liquid crystal display on the upper surface of the keypad for displaying operational information about the telephone.

3. The telephone of claim 2, further comprising:

calculator means using input from the keys of the keypad and the liquid crystal display;

said calculator means operating when the keypad is detached from said housing.

4. The telephone of claim 2, further comprising:

a controller inside said keypad and connected to the keys and the liquid crystal display.

5. The telephone of claim 4, further comprising:

a plurality of arithmetic function keys on said keypad and wired to said controller for inputting calculation data to the controller;

said controller comprising circuitry for performing arithmetic calculations.

6. The telephone of claim 1, further comprising:

a controller inside said keypad for detecting whether the keypad is in the recess.

7. The telephone of claim 6, further comprising a memory in said keypad connected to said controller.

8. The telephone of claim 1, where the keypad is essentially rectangular solid in shape.

9. The telephone of claim 1, where the first electrical connector is a male connector.

10. A method for operating a telephone with a removable keypad, comprising the steps of:

detecting by a controller in the keypad whether the keypad is in the telephone housing;

when the keypad is in the telephone housing, operating the keys of the keypad in telephone mode;

when the keypad is detached from the telephone housing, the controller going into standby mode; and when a function key is pressed on the keypad, the controller operating the keypad in calculator mode, displaying results on a liquid crystal display on the keypad.

11. A telephone, comprising:

a housing having a recess;

a detachable calculator fitting into said recess, said detachable calculator unconnected to the housing when detached from the housing and electrically connected to the housing when placed in said recess, said detachable calculator having a keypad; and a liquid crystal display on an upper surface of the detachable calculator for displaying the operational state of said keypad; said detachable calculator operating as a calculator when detached from said housing and operating as a telephone keypad when placed in said recess of said housing.

* * * * *